Figure 1:
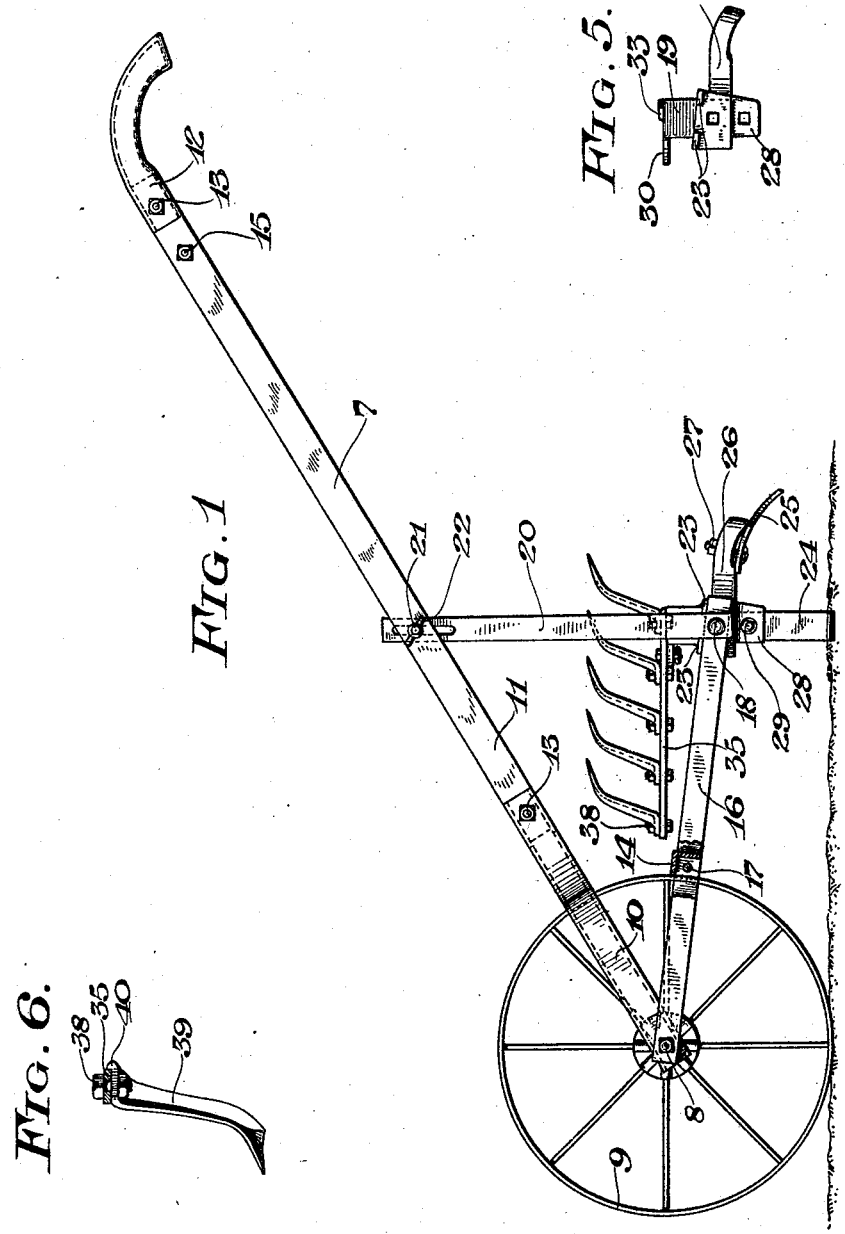

J. E. GILSON.
GARDEN TOOL.
APPLICATION FILED JUNE 7, 1920.

1,420,423.

Patented June 20, 1922.

3 SHEETS—SHEET 2.

FIG. 2

WITNESSES
O. E. Hyde
C. J. Naal

INVENTOR
John E. Gilson
By R. S. Caldwell
ATTORNEY

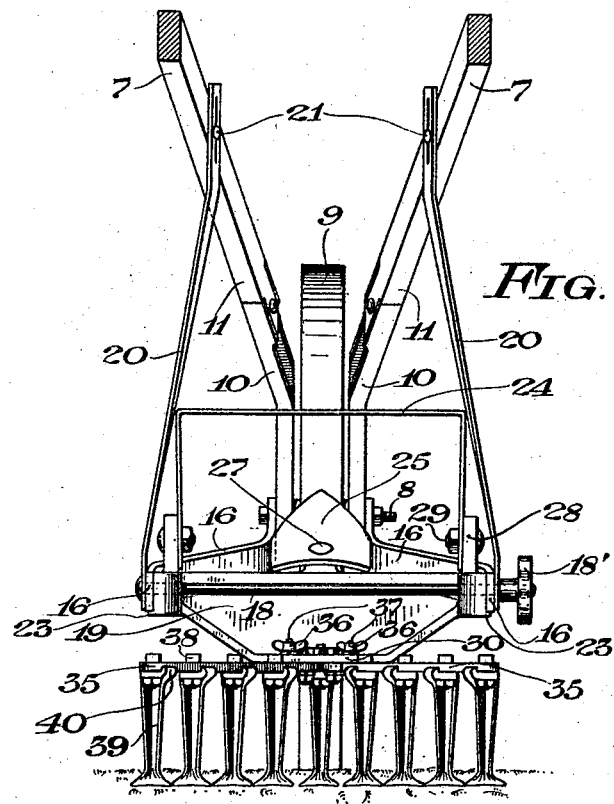
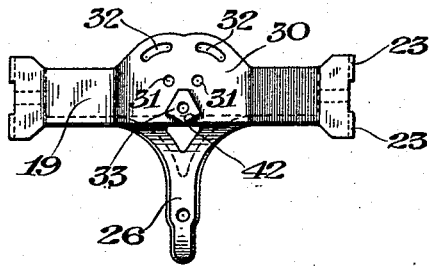

UNITED STATES PATENT OFFICE.

JOHN E. GILSON, OF PORT WASHINGTON, WISCONSIN.

GARDEN TOOL.

1,420,423.  Specification of Letters Patent.  Patented June 20, 1922.

Application filed June 7, 1920. Serial No. 387,258.

*To all whom it may concern:*

Be it known that I, JOHN E. GILSON, a citizen of the United States, and resident of Port Washington, Ozaukee County, State of Wisconsin, have invented new and useful Improvements in Garden Tools, of which the following is a description, reference being had to the accompanying drawings, which are a part of this specification.

The invention relates to garden cultivators and more particularly of that type in which several implements are mounted on a common carrier which may be turned to bring the desired tool into use.

The object of the invention is to improve generally upon devices of this character, the invention consisting of the several features hereinafter set forth and more particularly defined by claim at the conclusion hereof.

In the drawings: Fig. 1 is a side elevational view of a device embodying the invention; Fig. 2 is a plan view thereof; Fig. 3 is a rear elevation view; Fig. 4 is a detail view of the implement carrier; Fig. 5 is an end view of said carrier; Fig. 6 is a detail view of one of the cultivator teeth and its mounting.

In the drawings the numeral 7 designates handle members which are secured at their front ends to a bolt 8 forming an axle for a wheel 9. While each handle member may be of a single channel iron construction it is preferred for the purpose of easy shipment and reduction of weight to make each member in sections and bolt them together. In the present instance I have shown the handle member as made up of a channel iron section 10, a wood section 11, and a metal grip section 12, said sections being secured together by bolts 13. The handle members are connected together by a brace rod 15. A transverse frame member 14 connects the members 16 together and forms a scraper for the wheel.

Side frame members 16 are connected to the bolt 8 and the bolt 17 and are curved outwardly and thence extend rearwardly. These members 16 form a fork construction and are of metal and adapted to have some yield so that their free ends may be drawn together by a clamping nut 18' and a long bolt or shaft 18 into clamping engagement with an implement carrier 19 mounted on said shaft. The free ends of these members 16 are connected to the handle members by means of braces 20 which are secured to the members 16 by the bolt 18 and to the handle members by bolts 21 provided with wing nuts 22. The upper ends of these braces which engage the bolts 21 are slotted so as to permit of vertical adjustment of the implement carrying frame so that the working depth of the tools may be adjusted as desired.

On the ends of the carrier 19 are spaced extensions or lugs 23 which lugs are adapted to engage with the arms of the frame when the carrier is clamped thereto, by means of the nut 18', in its desired position, thereby preventing any oscillation of the carrier when the device is in use. When the nut 18' is loosened the frame members 16 spring apart so as to clear the lugs 23 under which conditions the carrier 19 may be turned freely upon the shaft 18.

The carrier has a toothed cultivator, a hoe 24 and a small plow or shovel 25 secured thereto. The cultivator is disposed at right angles to the plow and the plow at right angles to the hoe so that by turning the carrier either one of these implements may be brought into operative position.

The carrier has a lug 26 to which the plow 25 is secured by a bolt 27 and spaced lugs 28 to which the legs of the U-shaped hoe 24 are secured by bolts 29.

The carrier also has an outwardly extending flange 30 provided with bolt holes 31, arcuate slots 32 and an apertured lug 33.

Bolts 34 pass through the holes 31 and to the carrier clamp adjustable arms 35 which swing upon the flange 30 to various angular positions with respect to each other and to said carrier and are clamped in their various adjustments by winged nuts 36 on clamping bolts 37 which pass through the arms and travel in the arc-shaped slots 32.

Each arm 35 has bolts 38 passing through it and securing to the bottom face thereof a series of weeder or cultivator teeth 39. Each tooth has a lug 40 angularly disposed to engage the arm to prevent the tooth from turning. A tooth 39 is also secured by a bolt 41 to the lug 33 and its lug 40 engages an angled side 42 of said lug to prevent it from turning, said tooth being in advance of the others and forming a central leader tooth at the apex of the V-shaped formation in which the two rows of teeth are arranged. The effective width of the cultivator or weeder may be varied by loosening the winged nuts 36 and swinging the arms on the bolts 34 so as to adapt the tools for use the full width of space between the rows. When it is desired to operate on both sides of a row of plants the front tooth may be removed from the carrier which will leave a gap in the series of cutting teeth that will permit the device to pass over the plants without injury to them.

The lug 33 brings the front or leader tooth to the same level as the lower surface of the arms so that all teeth may be uniform.

In Fig. 1 the carrier is secured in position to bring the hoe 24 into operation, the lugs 23 then engaging the upper side of the members 16. To bring the plow into operation the nut 18' is loosened, permitting the frame members 16 to spring apart, and the carrier is then rotated ninety degrees at which position the lugs 23 straddle the members 16. The nut 18' is then tightened up drawing in on the free ends of the members 16 and bringing them into clamping engagement with the carrier, the lugs 23 then being above and below these members and thus preventing any rotation of the carrier. If now the carrier is loosened as before and given another quarter turn the teeth 39 are brought into operative position and the lugs 23 then engage the underside of the frame members 16 to prevent rotation of the carrier.

Due to the fact that the arms 16 always have a tendency to spring apart, it is an easy matter to adjust the position of the carrier without manipulating the arms, as loosening up the nut 18' permits free movement to the carrier which may be held in the desired position with one hand while tightening up the nut 18' with the other hand.

What I claim as my invention is:

In a cultivator of the multiple tool type, a revoluble carrier comprising a member having outwardly extending spaced lugs adjacent its ends for attachment to an implement, a centrally disposed outwardly extending lug for attachment of another implement and a flat face, said lugs and face being radially arranged with respect to each other, an implement-attaching projection extending outwardly from said flat face, implement-carrying arms pivotally mounted on said flat face on radii centered in said projection, said flat face having arcuate slots, and clamping means cooperating with said slots to secure said arms in adjusted position.

In testimony whereof, I affix my signature.

JOHN E. GILSON.